United States Patent [19]
Hayes et al.

[11] Patent Number: 4,846,701
[45] Date of Patent: Jul. 11, 1989

[54] QUICK DISCONNECT SMART CONNECTOR
[75] Inventors: Earl J. Hayes, Advance, N.C.; Jose L. Ortega, Hershey, Pa.
[73] Assignee: AMP Incorporated, Harrisburg, Pa.
[21] Appl. No.: 133,714
[22] Filed: Dec. 16, 1987
[51] Int. Cl.⁴ ............................................. H01L 29/00
[52] U.S. Cl. ...................................... 439/620; 439/70; 357/80
[58] Field of Search ...................... 439/68, 69, 70, 620; 174/52 FP; 357/80

[56] References Cited
U.S. PATENT DOCUMENTS

| 3,484,864 | 12/1969 | Bernstein et al. | 439/620 X |
|---|---|---|---|
| 4,158,745 | 6/1979 | Keller . | |
| 4,252,864 | 2/1981 | Coldeen . | |
| 4,293,947 | 10/1981 | Brittain . | |
| 4,339,768 | 7/1982 | Keller et al. . | |
| 4,508,399 | 4/1985 | Dowling et al. . | |
| 4,530,003 | 7/1985 | Blair et al. . | |
| 4,611,389 | 9/1986 | Blair et al. . | |
| 4,699,445 | 10/1987 | Porta et al. . | |

Primary Examiner—Eugene R. LaRoche
Assistant Examiner—Robert J. Pascal
Attorney, Agent, or Firm—Robert W. Pitts

[57] ABSTRACT

An interconnection package including a logic device attached to leads in a lead frame for use with a wiring harness is disclosed. The stamped and formed lead frame includes at least one lead having a disconnectable receptacle contact integral with tabs for through hole attachment of the logic device. The disconnectable receptacle contact includes arcuately formed springs formed upwardly from the lead frame and the tabs are formed downwardly from the lead frame so that the receptacle contact will not be contaminated during wave soldering. In the preferred embodiment, receptacle contacts project from one side of a body encapsulating the logic device and plug contacts project from another side of the body so that the interconnection package can be attached both to a conventional wiring harness and to servomechanical components equipped with conventional terminals.

12 Claims, 4 Drawing Sheets

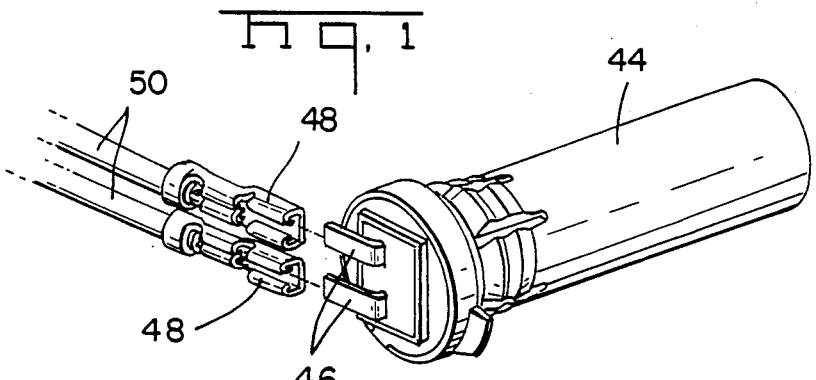
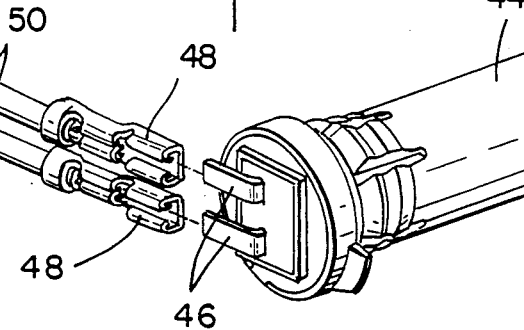
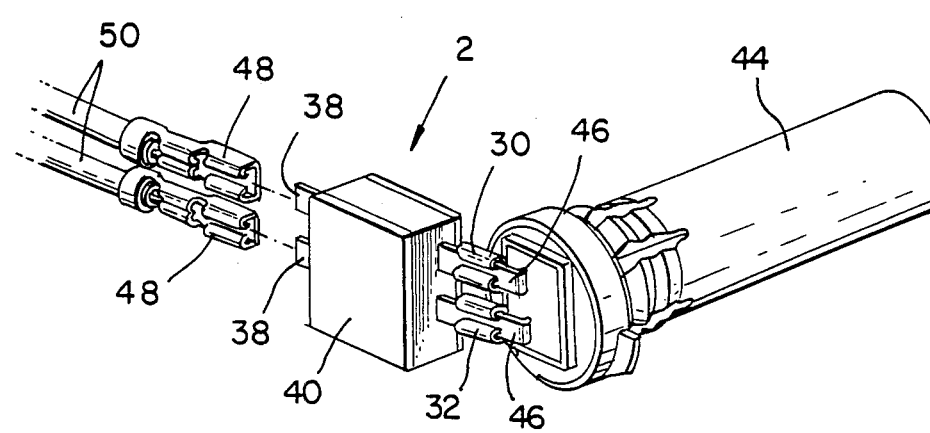
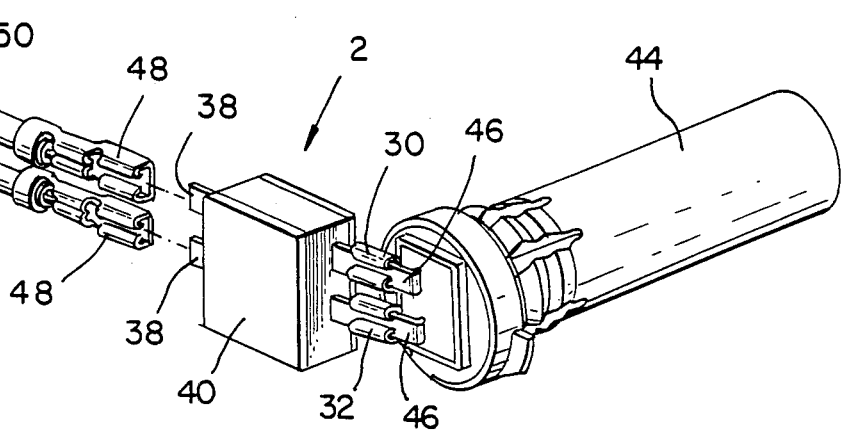

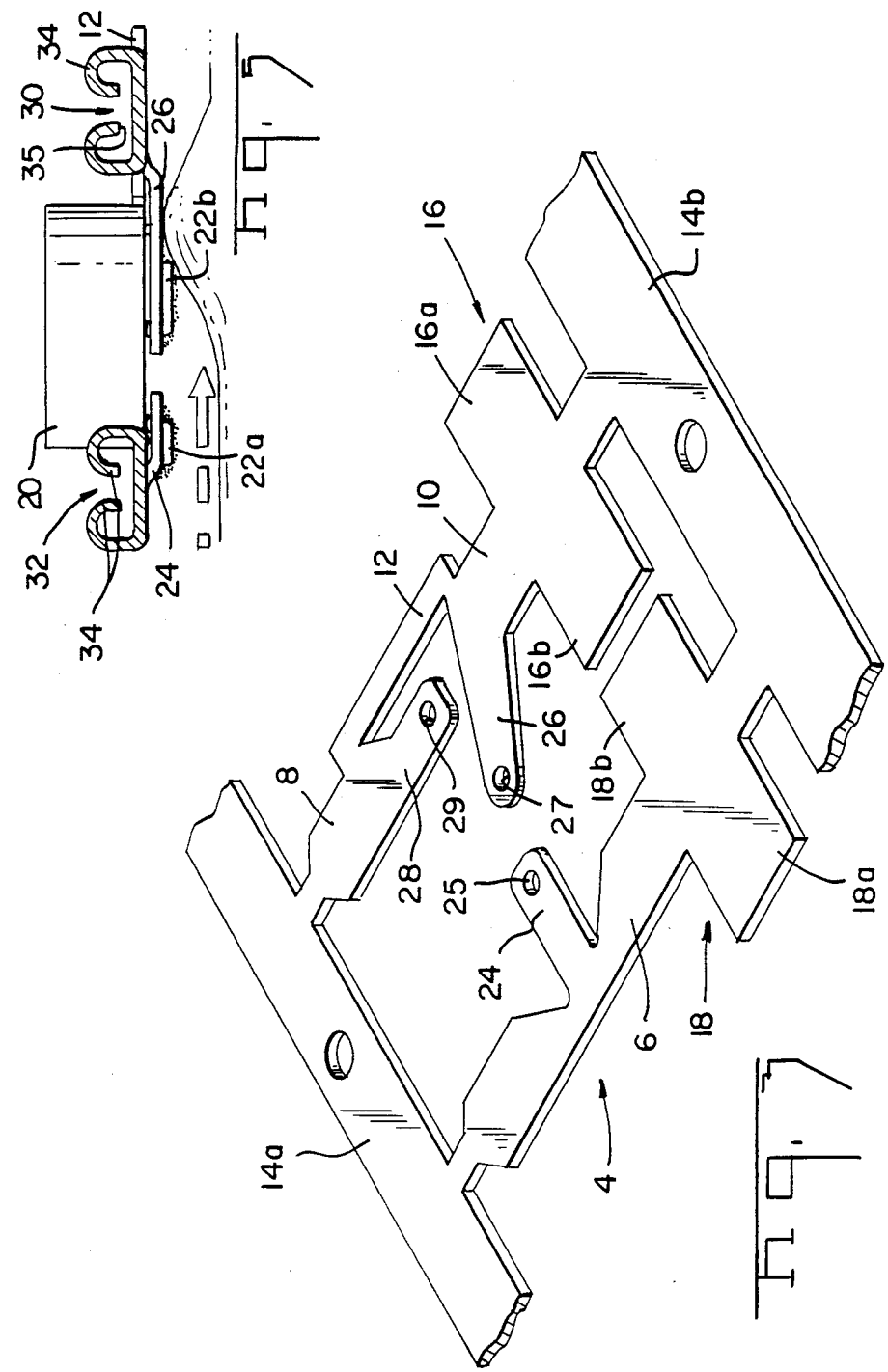

U.S. Patent   Jul. 11, 1989   Sheet 4 of 4   4,846,701
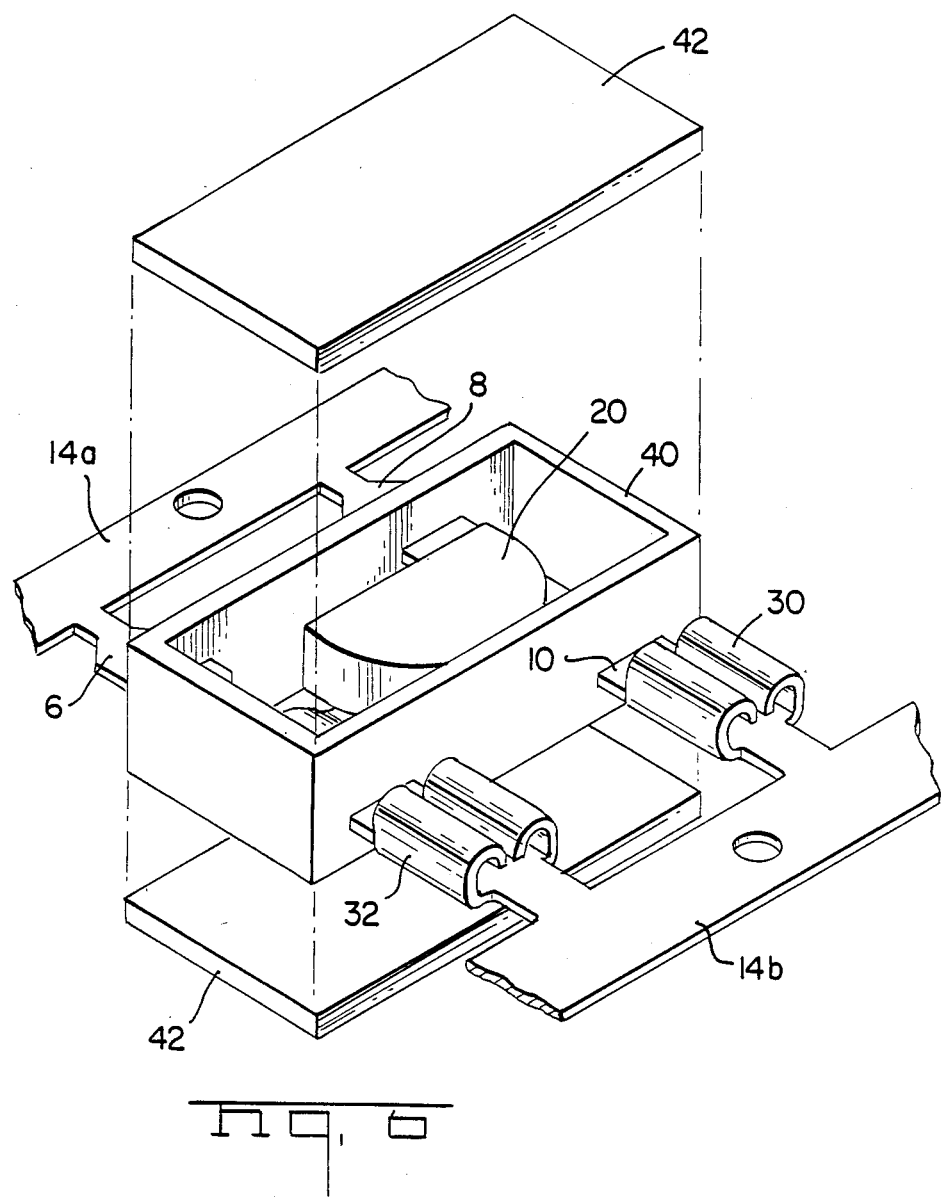

QUICK DISCONNECT SMART CONNECTOR

BACKGROUND OF THE INVENTION

1. Field of the Invention

This invention relates to an electrical connector for use in an electrical system including an electrical harness and more particularly to an electrical connector having a smart component, such as a logic device or integrated circuit chip, incorporated as a part of the electrical connector.

2. Description of the Prior Art

Electrical wiring systems including electrical harness formed of a number of discrete conductors, such as wires, are commonly used to interconnect servomechanical components in automobiles, appliances and in other devices. Discrete servomechanical components such as sensors and transducers are connected together by the electrical harness. Typically these servomechanical devices do not possess any intelligence or computational capability. Such devices either respond to or generate a digital or analog signal. Such devices are typically controlled by a central control station, which can be in turn manually controlled or controlled by a microprocessor or other computational device. Electrical harnesses constructed in this manner employ point to point wiring.

With the introduction of microcomputers and microprocessors into electromechanical systems, some economies were realized by employing buss technology. However, the utilization of buss technology has generally required the utilization of some form of hand shaking, that is the recognition by the controlled device of the address sent by the microcomputer which is unique to the particular recognition device. Further, this type of technology generally utilizes ribbons of parallel conductors requiring a multitude of wires for signals such as address, command, resets, interrupts, power, grounds and timing. Additionally, such ribbon or buss type technologies which loop around electromechanical systems are susceptible to induced electrical noise which may require the use of sophisticated and extensive error detection and error correction techniques. It is desirable that the electrical system be bi-directional having the capability of transmitting and receiving commands and responses to and from discrete servomechanical sensors and transducers employed in the system. Such a system requires some interconnection apparatus containing a logic device which can be connected to conventional sensors or transducers, unless new servomechanical components containing such intelligent or smart capabilities are to be employed. U.S. Pat. No. 4,508,399 discloses one such component which employs an insulation displacement technique for attaching a smart connector to the conductors in a multi-conductor ribbon connector. U.S. Pat. No. 4,293,947 discloses an addressable connector which can be attached to the conductors in a multiconductor cable.

An alternative approach for use with a logic device or integrated circuit component is disclosed in U.S. Pat. No. 4,158,745 which employs a lead frame package for incorporating logic devices into a harness comprised of insulated wires. The package depicted therein has male terminal tabs deployed in a conventional configuration to mate with a separate connector having receptacle contacts. Other similar devices employing male terminals to connect with a separate connector having female receptacles are depicted in U.S. Pat. Nos. 4,252,864; 4,339,768; 4,530,003; and 4,611,389.

SUMMARY OF THE INVENTION

The apparatus comprising the preferred embodiment of this invention includes a lead frame attachable to a logic device such as a conventional leaded transistor or other solid state component. The interconnection package can be used to connect servomechanical components to an electrical harness and to dispose the logic device between the harness and a conventional sensor or transducer lacking the intelligence to be provided by the logic device. At least one of the leads in the lead frame includes a stamped and formed female receptacle contact integral with the means for attaching the logic device in the component. The receptacle contact projects from an insulative body housing the logic device. The receptacle contact can then be employed to mate with a standard male terminal or plug contact of the type generally employed on conventional servochemical components. In the preferred embodiment of the invention a plurality of quick disconnect receptacle contacts project from one side of the body and a plurality of quick disconnect plug contacts project from the other side of the body. Apparatus of this type can then be attached both to conventional components having conventional male terminals and to a conventional electrical harness employing conventional female terminals or vice versa. Thus a conventional harness can be converted into a harness having logic devices disposed in conjunction with the conventional servomechanical components by simply adding the interconnection package which comprises the preferred embodiment of this invention. Thus no other new components are required and the same harness can still be employed.

BRIEF DESCRIPTION OF THE DRAWINGS

FIG. 1 depicts a conventional electromechanical sensor and shows the manner in which such a sensor would be attached to the wires in a harness in a prior art electrical system.

FIG. 2 depicts the intelligent interconnection package of the present invention and the manner in which it would be employed with the components of the prior art electrical system of FIG. 1.

FIG. 3 depicts the stamped lead frame which comprises an element of the interconnection package.

FIG. 5 depicts the manner in which the logic device is wave soldered to the lead frame.

FIG. 6 the insert molding of an insulative body around the logic device.

DETAILED DESCRIPTION OF THE PREFERRED EMBODIMENT

Figure 4:
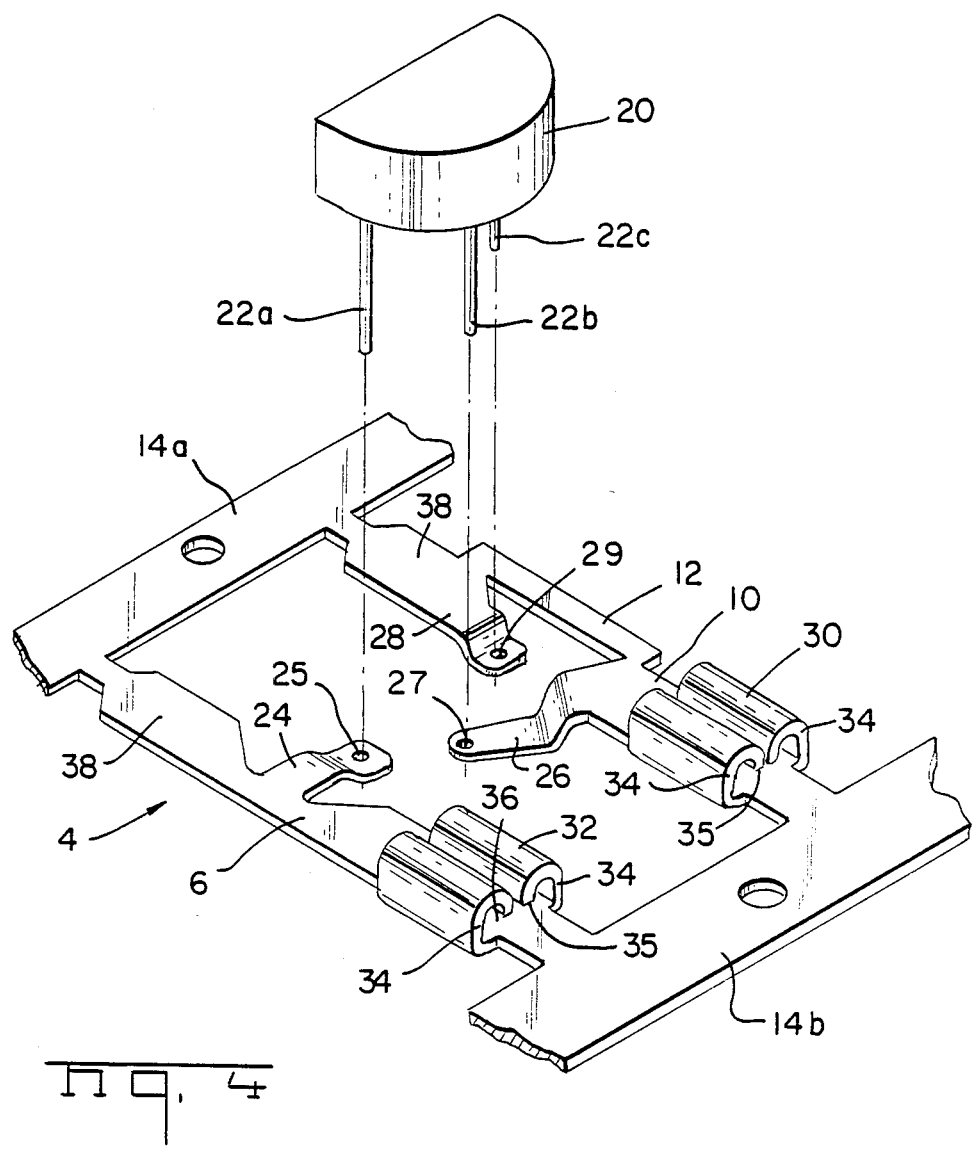
FIG. 4 depicts the stamped and formed lead frame and the logic device attachable thereto.

A conventional electrical system suitable for use in an automobile, an electrical appliance, or any of a number of other devices would employ a number of servomechanical sensors and transducers such as the fluid level sensor 44 depicted in the prior art configuration of FIG. 1. A typical fluid level sensor of this type would employ conventional terminals 46 for connection to the individual wires 50 of an electrical harness. The conventional servomechanical device 44 depicted in FIG. 1 comprises a fluid level sensor which could use a read switch or a hall effect cell in an automotive component. The component 44 is completely conventional in construction and any of a number of conventional components would be used in the same manner. The terminals 46 employed on this particular device comprise male quick disconnect terminals of conventional construction. The individual wires 50 employed in the electrical harness can be crimped to conventional quick disconnect receptacle contacts 48. One interconnection system employing quick disconnect terminals 48 and male quick disconnect terminals or tabs 46 would comprise male and female FASTON terminals. FASTON is a trademark of AMP Incorporated.

The apparatus comprising the preferred embodiment of the invention disclosed herein comprises an interconnection package suitable for interconnecting discrete logic devices to discrete components, such as servomechanical sensor 44, in a servo system. This interconnection package 2 comprises a smart connector including a lead frame 4 to which a logic device 20 is mechanically and electrically secured. The logic device 20 is contained within an insert molded body 40 which has two quick disconnect receptacle contacts 30 and 32 projecting from one side. These quick disconnect receptacles have curved spring arms 34 spaced from the sides of the body 40. Quick disconnect plug contacts 38 project from the opposite side of the body 40. As shown in FIG. 2, the male terminals 46 of the sensor 44 can be mated with the quick disconnect receptacle contacts 30 and 32. The male quick disconnect plug contacts extending from the opposite side of body 40 can likewise be attached in the same manner to the female quick disconnect terminals 48 on individual wires 50 of the conventional electric harness, thus disposing the logic device 20 in association with the discrete servomechanical component 44.

FIG. 3 depicts a stamped lead frame 4 extending between two carrier strips 14a and 14b. Each lead frame 4 comprises a single common lead 6 extending between opposite carriers and a single plug lead 8 attached to carrier strip 14a and a single receptacle lead 10 attached to carrier strip 14b. In the stamped blank configuration shown in FIG. 3, a support member 12 extends between the plug lead 8 and the receptacle lead 10 so that a single stamped member comprising plug lead 8, contact lead 10, and support member 12 extends between opposed carrier strips 14a and 14b.

A stamped receptacle blank 16 is shown in FIG. 3. This stamped receptacle blank comprises a pair of laterally extending wings 16a and 16b extending from opposite edges of the receptacle contact lead 10. A similar stamped receptacle blank 18 is formed with laterally extending wings 18a and 18b on opposite edges of the common lead 6. Note that both receptacle blanks 16 and 18 are located adjacent to carrier strip 14b.

FIG. 4 shows the manner in which the stamped receptacle blanks 16 and 18 are arcuately formed upwardly from the respective leads 8 and 10. By forming these blanks in a conventional manner, quick disconnect receptacles 30 and 32 are formed respectively on leads 8 and 10. Opposed spring arms 34 are formed on opposite sides of a longitudinally extending central section 36. These arcuately formed opposed springs 34, formed from the initially flat sections laterally projecting from the edges of the longitudinally extending central section 36 have free ends 35 spaced from the central section. The upwardly extending arcuately formed spring 34 receive a male terminal having the configuration of the plug contacts 38 inserted between the free ends 35 of the spring arms and the longitudinally extending central section 36 to form a secure mechanical and electrical interconnection.

In the preferred embodiment of this invention, the logic device 20 is attached to the leads 6, 8 and 10 by means of logic device leads 22a, 22b and 22c. Each of the package leads 6, 8 an 10 includes tabs 24, 26 and 28, respectively, which extend in a pattern corresponding to the arrangement of leads 22a, 22b and 22c adjacent the center of the lead frame 4. When the receptacles 30 and 32 are formed in the manner shown in FIG. 3, the tabs 24, 26 and 28 are also formed or shaped as shown in FIG. 4. The receptacle contacts 30 and 32 are formed upwardly from the longitudinally extending central portion of the receptacle contacts 30 and 32 while the tabs 24, 26 and 28 are offset downwardly from the plane of the lead. Each of the tabs 24, 26 and 28 has a hole 25, 27 and 29, respectively, for receiving a logic device lead 22a, 22b or 22c.

The logic device 20 is attached to the lead frame 4 by first inserting logic device leads 22a, 22b and 22c into holes 25, 27 and 29, respectively. The leads can then be trimmed to length and bent to extend along the tabs 24, 26 and 28, as shown in FIG. 5. The leads 22a, 22b and 22c can thus be wave soldered to tabs 24, 26 and 28 in the manner shown in FIG. 5. Since the tabs 24, 26 and 28 are offset below the plane of the lead frame 4 and below the receptacle contacts 30 and 32 which extend above the lead frame central plane, the receptacle contacts 30 and 32 will not be contaminated by the wave soldering. Either before or after the wave soldering step depicted in FIG. 5, the support member 12 xan be severed from the plug lead 8 and the receptacle lead 10. The support member 12 serves to maintain the attachment tabs 24, 26 and 28 in a fixed spatial relationship so that the logic device leads 22a, 22b and 22c can be inserted through holes 25, 27 and 29. The support member 12 is, however, spaced from the attachment tabs 24, 26 and 28 by a distance sufficient to permit the support member to be severed after the logic device is attached to the lead frame.

As shown in FIG. 6, a insulative body 40 can be insert molded around the logic device 20. Caps 42 can then be attached above and below the insert molded body 40, thus completely encapsulating the logic device 20. Caps 42 can be ultrasonically bonded or a suitable adhesive can be used to secure the caps to the insert molded body 40. Alternatively, the logic device can be potted in the body 40 by using a conventional potting material, or a potting material can be used in addition to the caps 42.

An interconnection package such as that depicted in the preferred embodiment of this invention can be employed to mate with conventional quick disconnect receptacles and contacts used in a conventional prior art harness. It should be understood, however, that other receptacle contacts could also be formed on the outwardly projecting leads and a number of different configurations other than that depicted herein would be obvious to one of ordinary skill in the art.

We claim:

1. A lead frame for interconnecting a logic device to discrete components in a wiring harness, the lead frame comprising a plurality of leads each having means for attachment to the logic device, at least one of the leads having a stamped and formed disconnectable receptacle contact integral with the means for attachment to the logic device: at least one lead having a plug contact integral with means for attachment to the logic device; and wherein each lead including a receptacle contact comprises a longitudinally extending central section with opposed springs arcuately formed from initially flat sections laterally projecting from edges of the longitudinally extending central section, the springs extending upward from the central section so that free ends of the srings are spaced from the central section to resiliently engage a male terminal, having the same configuration as each plug contact, inserted between the free ends of the springs and the longitudinally extending central section.

2. The lead frame of claim 1 wherein each means for attachment to the logic device comprises means solderable to the logic device.

3. The lead frame of claim 2 wherein each means solderable to the logic device comprises a tab offset below the longitudinal central section of each receptacle contact and below each plug contact.

4. The lead frame of claim 3 further comprising a severable support member, in the same plane as the longitudinal central section of each receptacle contact, joining a lead having a stamped and formed receptacle contact and a lead having a plug contact member adjacent to the respective means for attachment to the logic device.

5. The lead frame of claim 4 wherein each tab has a hole through which a logic device lead can be inserted for wave soldering.

6. Apparatus for interconnecting discrete logic devices to discrete components in a servo system, the apparatus including a lead frame and a logic device, the lead frame comprising at least one lead with means for attachment to the logic device integral with a stamped and formed disconnectable receptacle contact, the means for attachment being within a body encapsulating the logic device with the receptacle contact projecting from the body, wherein the lead frame further comprises at least one lead including means within the body for attachment to the logic device integral with a plug contact projecting from the body; and wherein the receptacle comprises a quick disconnect receptacle contact mateable with a male terminal having the same configuration as the plug contact: and wherein each lead including a receptacle contact comprises a longitudinally extending central section with opposed springs arcuately formed from initially flat sections laterally projecting from edges of the longitudinally extending central section, the springs extending upward from the central section so that free ends of the springs are spaced from the central section to resiliently engage a male terminal, having the same configuration as each plug contact, inserted between the free ends of the springs and the longitudinally extending central section, whereby discrete logic devices can be associated directly with discrete components in the servo system.

7. The apparatus of claim 6 wherein a plurality of receptacle contacts project from one side of the body and a plurality of plug contacts project from another side of the body.

8. The apparatus of claim 7 wherein each means within the body for attachment to the logic device comprises means solderable to the logic device.

9. The apparatus of claim 14 wherein each means solderable to the logic device comprises a tab offset below the longitudinal central section of each receptacle contact and below each plug contact.

10. The apparatus of claim 9 wherein the body comprises an insert molded insulative member.

11. A method of constructing an interconnection package for use with a wiring harness having a plurality of discrete conductors having disconnectable contacts attached thereto and servomechanical components having mating disconnectable contacts attached thereto, comprising the steps of:
  stamping a lead frame having a plurality of leads, at least one of the leads having means for attachment of a logic device integral with a stamped receptacle blank and at least one other lead having means for attachment of a logic device integral with a stamped plug blank;
  forming the stamped receptacle blank upward from the lead frame to form a disconnectable receptacle contact;
  positioning a logic device in engagement with the means for attachment of the logic device on the leads;
  wave soldering the logic device to the leads;
  encapsulating the logic device within a body with the disconnectable receptacle contact projecting therefrom, whereby the interconnection package can be attached to the conductors in the wiring harness and to the servomechanical components so that a logic device can be associated with individual servomechanical components: and
  the further step of forming tabs comprising the means for attachment of a logic device to offset the tabs from the lead frame in the opposite direction from the disconnectable receptacle contact prior to wave soldering the logic device to the leads so that the disconnectable receptacle contact will be contaminated by the wave soldering process.

12. A lead frame for interconnecting a logic device to discrete components in a wiring harness, the lead frame comprising a plurality of leads each having means for attachment to the logic device, at least one of the leads having a stamped and formed disconnectable receptacle contact integral with the means for attachment to the logic device; at least one lead having a plug contact integral with means for attachment to the logic device; and a severable support member joining a lead having a stamped and formed disconnectable receptacle contact and a lead having a plug contact, the support member being adjacent to the respective means for attachment to the logic device and comprising means for maintaining separate means for attachment in a fixed spatial relationship so that logic device can be attached thereto, the support member being spaced from the means for attachment by a distance sufficient to permit the support member to be severed after the logic device is attached to the lead frame.

* * * * *